Patented Apr. 4, 1950

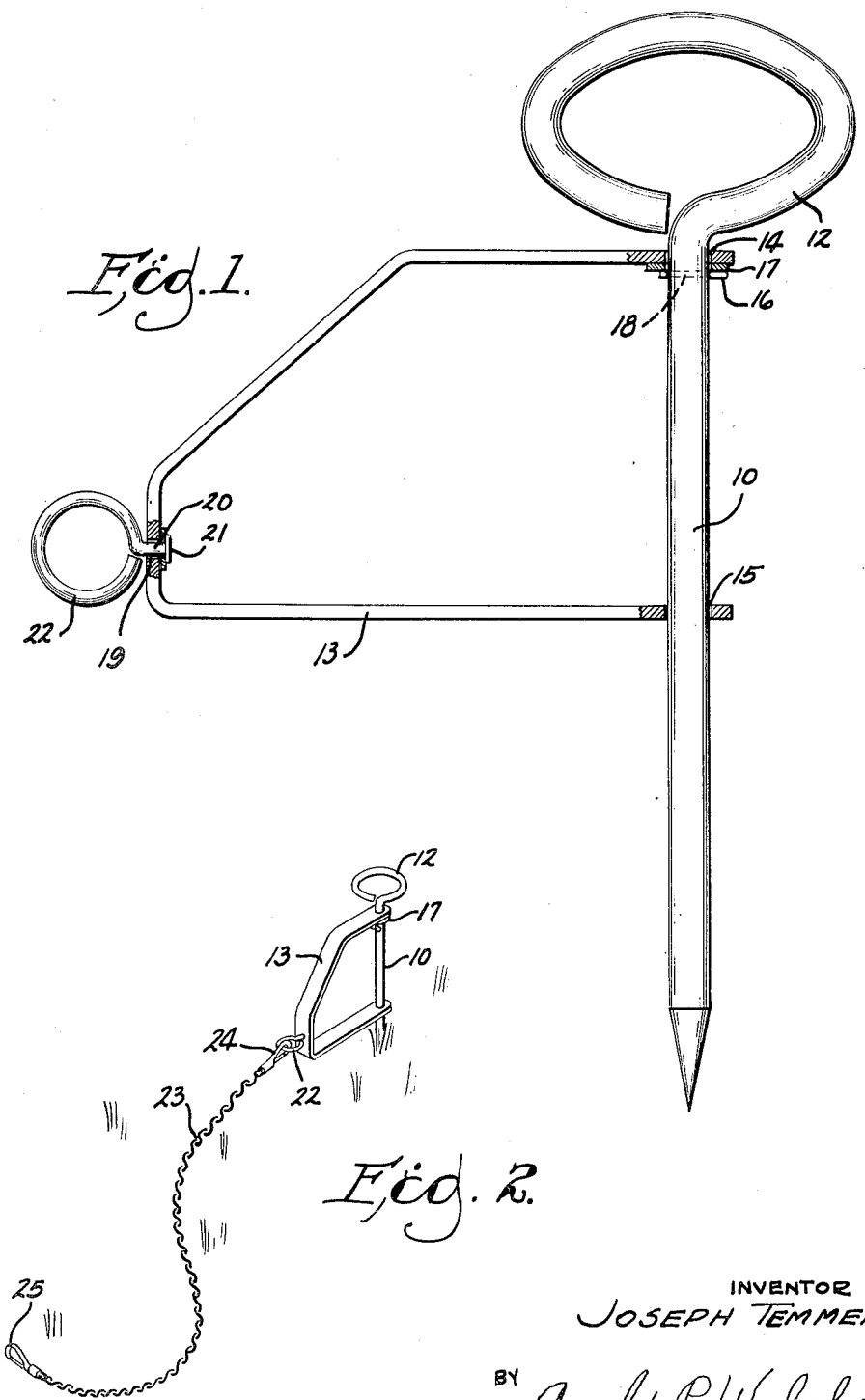

2,502,807

UNITED STATES PATENT OFFICE 2,502,807

ANIMAL TETHER

Joseph Temmer, Escanaba, Mich.

Application November 19, 1945, Serial No. 629,616

3 Claims. (Cl. 119—121)

This invention relates to improvements in animal tethers, and more particularly to a novel tether adapted to secure a dog or other animal.

An object of the invention is to provide a device of the type which may easily be pressed into or withdrawn from the ground with means not heretofore provided on other devices of the type hitherto constructed.

Another object of the invention is to provide a device having improved rotatable anchoring means which will effectually prevent entanglement of a tethering line or chain securing an animal thereto.

Other and further objects of the invention will appear as the description proceeds, reference being had to the accompanying drawing, in which:

Fig. 1 is a view partly in elevation and partly in section of an animal tether embodying my invention.

Fig. 2 is a view in perspective of the device.

Referring more particularly to the drawings, the numeral 10 refers to the standard having a point 11 at the lower end thereof and the integral handle member 12 at the top.

A substantially triangular bar member 13 has apertures at 14 and 15 thereof freely engaging the standard 10. A cotter pin 16 and washer 17 support the rotatable bar member 13 at the desired height relatively to said standard. The cotter pin 16 is held in the boring at 18 of standard 10. The bar 13 is punched at 19 to accommodate the shank 20 with retainer flange 21 of the rotatable eye 22.

A leash chain 23 is attached by means of snap hook 24 to the eye 22, and has another snap hook 25 for engagement with a dog's collar or the like.

In use, the standard 10 may be pressed into the ground at a desired location, as shown in Fig. 2, by means of manual pressure on the handle member 12. The leash chain 23 attached to the animal by the snap hook 25 may then be engaged with the freely rotatable eye 22 by means of the snap hook 24.

It will be apparent that no movement of the animal can entangle the leash chain 23.

It will be understood that the device is capable of many modifications in structure and design, without departing from the spirit of the invention, within the scope of the appended claims.

Having thus described my invention, what I claim and desire to secure by Letters Patent of the United States, is:

1. In a device of the character described including a standard adapted for partial insertion into the ground, a flat bar member provided with bends at a plurality of points so that the end portions are spaced and parallel and having a pair of apertures through said end portions freely engaging the standard for horizontal rotation of said bar member, and a rotatable eye journaled in said bar member and extending outwardly thereof with reference to the standard, and a pin in said standard to prevent downward movement of the bar on said standard.

2. An animal tether comprising a round rod stem pointed at one end for insertion into the ground, the upper end of said stem including an integral oblately circular hand-grip, a flat bar member comprising a relatively long horizontal lower segment, a short vertical segment therein extending vertically and having an aperture therethrough, an oblique segment extending upwardly therefrom, a relatively short horizontal segment extending from said oblique segment whereby said bar has spaced and parallel ends apertured and freely engaging in said apertures the stem below said handle, and a rotatable member having an eye therein journalled in the aperture of the vertical segment of said bar member.

3. An animal tether comprising a round stem pointed at its lower end for insertion into the ground, the upper end of said stem including an integral circular hand grip on a vertical plane, a flat bar member including an integral relatively long horizontal lower segment and a relatively short upper segment and having apertures in its end portions freely engaged with said stem for rotation of the bar therearound, and a rotatable member having an eye therein journaled at the end of the long horizontal segment in said bar for connection with an animal leash.

JOSEPH TEMMER.

REFERENCES CITED

The following references are of record in the file of this patent:

UNITED STATES PATENTS

| Number | Name | Date |
|---|---|---|
| 91,042 | Raiford | Jan. 8, 1869 |
| 113,318 | Lyon | Apr. 4, 1871 |
| 244,843 | Battelle | July 26, 1881 |
| 444,661 | Carl | Jan. 13, 1891 |
| 716,010 | Eldridge | Dec. 16, 1902 |
| 1,092,036 | Fry | Mar. 31, 1914 |
| 1,340,426 | Vick | May 18, 1920 |
| 1,579,294 | Fisk | Apr. 6, 1926 |
| 1,723,859 | Hummel | Aug. 6, 1929 |

FOREIGN PATENTS

| Number | Country | Date |
|---|---|---|
| 11,775 | Great Britain | 1894 |
| 3,393 | Great Britain | 1896 |
| 453,621 | Great Britain | 1936 |